No. 799,874. PATENTED SEPT. 19, 1905.
J. J. SMITH.
ANTISIPHON TRAP.
APPLICATION FILED MAY 11, 1905.
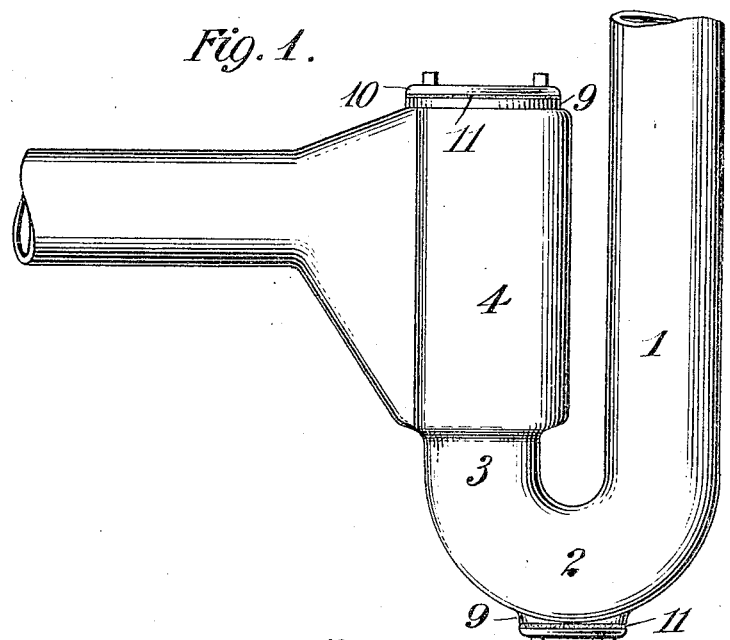
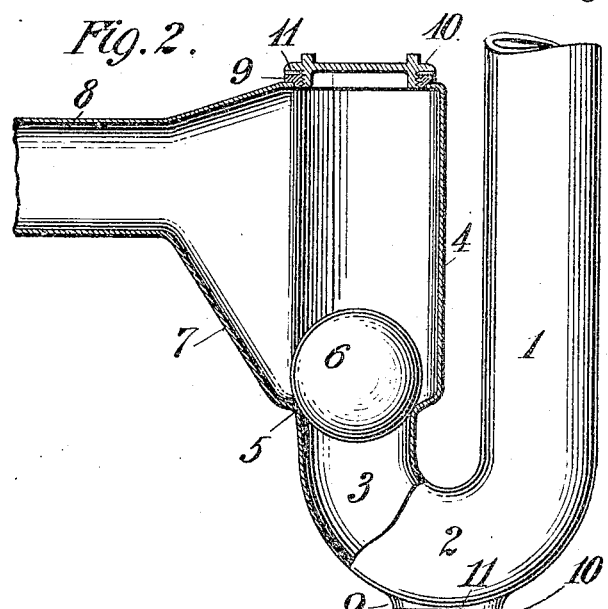
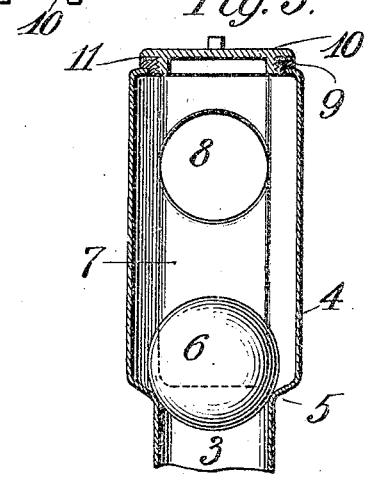
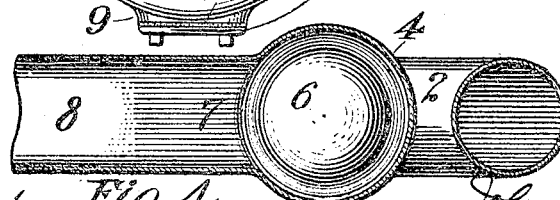
Witnesses
Frank S. Obre
H. A. Konnemann
Inventor
John J. Smith
By his Attorney
Henry J. Miller

UNITED STATES PATENT OFFICE.

JOHN J. SMITH, OF ELIZABETH, NEW JERSEY, ASSIGNOR OF ONE-HALF TO HENRY W. CRANE, OF ELIZABETH, NEW JERSEY.

ANTISIPHON-TRAP.

No. 799,874.      Specification of Letters Patent.      Patented Sept. 19, 1905.

Application filed May 11, 1905. Serial No. 259,883.

*To all whom it may concern:*

Be it known that I, JOHN J. SMITH, a citizen of the United States, residing at Elizabeth, in the county of Union and State of New Jersey, have invented certain new and useful Improvements in Antisiphon-Traps, of which the following is a specification, reference being had therein to the accompanying drawings.

This invention has for its object to provide a construction for that class of traps used in conjunction with sinks which are provided with loose ball-valves for maintaining normally closed the connection between the waste-pipe and the sink even in case the water seal should be accidentally broken by the siphoning out of the water; and it consists, essentially, in a ball-chamber having a lower contracted end affording a valve-seat and a ball of larger diameter normally resting thereon, such ball-chamber being provided in its upper portion with a lateral outlet of elongated form having less width than the diameter of the ball, whereby the ball is prevented from entering such outlet and sticking fast, so as to permanently close the connected waste-pipe to flow of water from the sink and the free and unobstructed passage of the liquid through some part of the elongated outlet-opening is insured in any position of the ball.

In the annexed drawings, Figure 1 is a side elevation of a trap constructed in accordance with my present invention. Fig. 2 is a similar view of the same partly in section. Fig. 3 is a transverse section taken through the center of the ball-chamber, and Fig. 4 a plan view of the device.

The general form of the trap is that of the common U shape with the vertical inlet-limb 1, the lower bend 2 forming the water-seal reservoir and the outlet-limb 3 enlarged in its upper portion to form the cylindrical ball-chamber 4, whose contracted lower end forms a valve-seat 5, upon which rests the valve-ball 6, which latter is in practice made of such weight as to slightly exceed the weight of the water displaced, whereby it is enabled to rest lightly upon its seat when completely submerged. The chamber 4 is provided with the outlet portion 7 of rounded elongated shape where it joins the cylindrical body of the ball-chamber and reduced at its outer end to conform at its junction with the cylindrical discharge-nozzle 8, of which the waste-pipe forms a continuation. The bottom of the lower portion 2 of the trap and the top of the ball-chamber 4 are provided with the usual bushings 9, forming seats for the screw-caps 10, with interposed washers 11 for access to the interiors of such parts.

As will be readily seen from a reference to Fig. 3, the elongated outlet-opening from the ball-chamber is sufficiently contracted and is of such depth that the ball 6 cannot under any circumstances seat itself in the mouth of the nozzle 8, and so obstruct the pipe, the flow of fluid through the trap thus tending to maintain the ball in such position if permitted to assume the same, although readily dislodged from the seat 5 by the natural flow of water through the trap.

While I have shown and described herein what I consider to be the preferable form of the present improvement, it is to be understood that the same may be modified materially without departure from the present invention, the essential feature of which is the formation of the ball-chamber with an outlet of such character that it not only excludes the ball, but affords sufficient outlet area past the ball in any position which it may assume within the confining-chamber to provide a free and unobstructed passage for the fluid and insure the immediate seating by gravity of the ball within the bottom of the chamber when the flow of liquid ceases.

The present improvement differs widely in practical efficiency in respect of other so-called "ball-traps" in affording a passage for the waste fluid which is continuous throughout the fitting and provided with unbroken walls, whereby no abrupt corners are presented for the accumulation of solid matter and the flow of fluid through the same is practically as free and unobstructed as in the ordinary running-trap, whose only obstruction to the flow of liquid is presented by bends in the channel. By reference to the drawings it will be observed that the junction of the ball-chamber with the adjacent portion of the fitting is constructed with a continuous inner surface which is smooth and unbroken, the seat 5 being rounded to avoid any angles serving to produce eddies of fluid in its passage, which would aid in forming deposits of solid matter at such points.

Having thus set forth the nature of my invention, what I claim herein is—

1. A ball-trap constructed with an upright enlargement constituting a ball-chamber, which is formed with continuous unbroken side walls and with a rounded valve-seat in its lower end of equal area with the adjoining tubular portion of the trap, a ball-valve within said chamber adapted to rest upon said seat, and an outlet from said ball-chamber of elongated form having a width less than that of the diameter of said ball but provided with smooth walls continuous with those of said ball-chamber.

2. A ball-trap comprising a U-tube having its outlet-limb formed with an enlargement joining the same in a continuous unbroken surface to constitute a ball-chamber, which is provided in the lower contracted end with a rounded valve-seat of equal area with that of the adjacent portion of the U-tube, a ball within said chamber adapted to rest upon said seat, a lateral discharge-pipe, and an elongated connecting-passage intermediate the same and said ball-chamber of a width less than the diameter of said ball, but having a smooth and unbroken inner surface continuous with that of said ball-chamber and lateral discharge-pipe.

In testimony whereof I have signed my name to this specification in the presence of two subscribing witnesses.

JOHN J. SMITH.

Witnesses:
HENRY W. CRANE,
HENRY J. MILLER.